US012253304B2

(12) United States Patent
Van Der Aa et al.

(10) Patent No.: US 12,253,304 B2
(45) Date of Patent: Mar. 18, 2025

(54) METHOD OF COOLING A CONTAINER COMPRISING A BEVERAGE

(71) Applicant: Heineken Supply Chain B.V., Amsterdam (NL)

(72) Inventors: Michiel Adrianus Henricus Van Der Aa, Amsterdam (NL); Antonius Henricus Andreas Donkers, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 358 days.

(21) Appl. No.: 17/775,347

(22) PCT Filed: Nov. 13, 2020

(86) PCT No.: PCT/NL2020/050716
§ 371 (c)(1),
(2) Date: May 9, 2022

(87) PCT Pub. No.: WO2021/096360
PCT Pub. Date: May 20, 2021

(65) Prior Publication Data
US 2022/0390168 A1 Dec. 8, 2022

(30) Foreign Application Priority Data
Nov. 13, 2019 (NL) .................................... 2024230

(51) Int. Cl.
*F25D 31/00* (2006.01)
*B67D 1/08* (2006.01)
*F25D 29/00* (2006.01)

(52) U.S. Cl.
CPC ......... *F25D 31/006* (2013.01); *B67D 1/0858* (2013.01); *F25D 29/00* (2013.01);
(Continued)

(58) Field of Classification Search
CPC .......... B67D 1/06; B67D 1/08; B67D 1/0857; B67D 1/0858; B67D 1/0861;
(Continued)

(56) References Cited

U.S. PATENT DOCUMENTS 4,671,070 A * 6/1987 Rudick .................. F25B 21/02 62/3.6
9,523,067 B2 * 12/2016 Wallace ................. C12C 13/10
(Continued)

FOREIGN PATENT DOCUMENTS

CL 202201225 5/2022
CN 103423964 B 2/2016
(Continued)

OTHER PUBLICATIONS

International Search Report for corresponding International Application No. PCT/NL2020/050716, dated Feb. 8, 2021, 2 pages.

*Primary Examiner* — Eric S Ruppert
*Assistant Examiner* — Hans R Weiland
(74) *Attorney, Agent, or Firm* — Banner & Witcoff, Ltd.

(57) ABSTRACT

A method is provided for cooling a beverage in a container, the container being provided in contact with a cooling contact body thermally conductively coupled to a cooling element. The method comprises operating the cooling element and obtaining an ambient temperature of the environment outside the container and the cooling contact body. Based on the ambient temperature, a cut on temperature is defined and a temperature value indicative of a temperature of the beverage is obtained. The cooling element is operated if the temperature is larger than the cut on temperature until an end criterion is met. A higher ambient temperature may require more cooling of the beverage to ensure the temperature of the beverage is maintained between acceptable boundaries. A higher environmental temperature, requiring more cooling, means faster switching on or off. By using a switch on temperature based on the ambient temperature, more efficient cooling may be established.

15 Claims, 8 Drawing Sheets

(52) U.S. Cl.
CPC .... *F25D 2331/806* (2013.01); *F25D 2700/14* (2013.01); *F25D 2700/16* (2013.01)

(58) Field of Classification Search
CPC ..... B67D 1/0862; B67D 1/0865; F25D 29/00; F25D 31/006; F25D 2331/806; F25D 2700/14; F25D 2700/16
See application file for complete search history.

(56) References Cited

U.S. PATENT DOCUMENTS

| | | | | |
|---|---|---|---|---|
| 9,648,977 | B2 * | 5/2017 | Carbone | A47J 31/404 |
| 2004/0016254 | A1 * | 1/2004 | Park | F25D 29/00 62/229 |
| 2005/0115250 | A1 | 6/2005 | Kim | |
| 2006/0131325 | A1 * | 6/2006 | Wauters | F25D 31/006 222/54 |
| 2018/0327243 | A1 | 11/2018 | Rider et al. | |
| 2019/0169013 | A1 * | 6/2019 | Paauwe | B67D 1/0406 |

FOREIGN PATENT DOCUMENTS

| | | | | |
|---|---|---|---|---|
| DE | 102004053273 | A1 | 5/2006 | |
| JP | H05-010969 | U | 2/1993 | |
| JP | 2007163082 | A | 6/2007 | |
| JP | 2015-169376 | A | 9/2015 | |
| JP | 2019167137 | A | 10/2019 | |
| WO | 03-056507 | A1 | 7/2003 | |
| WO | 2004050541 | A2 | 6/2004 | |
| WO | WO-2015133173 | A1 * | 9/2015 | F25D 17/065 |
| WO | 2018/009065 | A1 | 1/2018 | |
| WO | 2018212659 | A1 | 11/2018 | |
| WO | 2018212660 | A1 | 11/2018 | |

* cited by examiner

METHOD OF COOLING A CONTAINER COMPRISING A BEVERAGE

TECHNICAL FIELD

The various aspects and embodiments thereof relates to a cooling system for implementation in a liquid dispensing assembly. The invention relates to a cooling system for contact cooling of a container for liquid, especially for contact cooling a container and liquid contained therein to be dispensed. An aspect relates to a beverage dispensing system comprising such cooling system. Another aspect relates to a method for contact cooling a liquid container, especially a beverage container. A further aspect relates to a beverage dispensing assembly for dispensing a carbonated beverage from a plastic container.

BACKGROUND

In WO2018/009065 a fluid dispensing system is disclosed comprising a container containing a fluid to be dispensed and a device in which the container can be at least partly inserted. The device has a contact surface for cooling the container and the fluid contained therein by contact cooling.

SUMMARY

It is preferred to provide a beverage dispensing assembly which is an alternative to the known assemblies. More in particular, there is a preference to provide a beverage dispensing assembly which is relatively easy in use. As such, a beverage dispensing assembly which is relatively easy to manufacture and maintain may be provided. And it is preferred to provide a container suitable for a dispensing assembly as claimed. One aspect and embodiments thereof aim at providing a dispensing assembly in which a container can be used, which assembly in use provides for an appearance pleasing to users, such as for example beverage purchasing public and personnel, is easy to use and/or energy friendly, especially in cooling and dispensing.

A first aspect provides a method of cooling a container comprising a beverage, the container being provided in contact with a cooling contact body thermally conductively coupled to a cooling element. The method comprises operating the cooling element and obtaining an ambient temperature of the environment outside the container and the cooling contact body. Based on the ambient temperature, a cut on temperature is defined and a medium temperature indicative of a temperature of the beverage as a medium is obtained. The cooling element is operated if the medium temperature is larger than the cut on temperature until a pre-determined end criterion is met.

A higher ambient temperature may require more cooling of the beverage to ensure the temperature of the beverage is maintained between acceptable boundaries. Conventional cooling algorithms result in cooling if the temperature sensed is above a particular threshold and switching off cooling if the temperature sensed is below a particular other threshold. A higher environmental temperature, requiring more cooling, means faster switching on or off. It is appreciated by using a switch on temperature based on the ambient temperature, more efficient cooling may be established, while maintaining proper control of the temperature of the beverage—or another medium.

In an embodiment of the first aspect, the cut on temperature decreases if the ambient temperature rises. In this embodiment, the higher the ambient temperature, the lower the upper limit of the sensed temperature of the beverage is kept.

In another embodiment of the first aspect, the relation between the cut on temperature and the ambient temperature is substantially linear. This allows for relative simple control of the cooling element and therefore, of the temperature.

A further embodiment of the first aspect further comprises obtaining a beverage volume stored in the container; and defining the cut on temperature also based on the beverage volume. With a decreasing volume in the container, further effects that affect transfer of thermal energy from the beverage to the cooling element come into play. These effects may adversely affect proper cooling executed by a basic algorithm. For example, a lower volume may take up thermal energy faster, as the area/volume ratio increases. Therefore, it may be advantageous to take the amount of beverage in the container into account when defining the cut on temperature.

In yet a further embodiment, the cut on temperature rises if the beverage volume decreases. As discussed above, a lower volume may take up thermal energy faster, as the area/volume ratio increases. This embodiment ensures that with lower volumes, temperature control is maintained.

In again another embodiment, the pre-determined end criterion is at least one of a medium temperature end value of the medium temperature; and a cooling time interval lapsed from the moment of the start of the operation of the cooling element. The cooling operated may be terminated if either one—or both—of the criteria are met.

In again a further embodiment, the pre-determined end criterion is the cooling time interval lapsed from the moment of the start of the operation of the cooling element. This embodiment further comprises if the cooling time interval has lapsed, obtain the medium temperature and continue operation of the cooling element if the medium temperature is higher than or equal to the cut-on temperature, until the cooling time interval has lapsed again. This embodiment ensures that the cooling operation ends only if the temperature is below the cut on temperature. This is particularly advantageous at the initial operation of cooling a newly received full container with beverage at a relatively high temperature.

Yet a further embodiment further comprises if a pre-determined defrost interval has lapsed, not operating the cooling element if the medium temperature is larger than the cut on temperature until a pre-determined defrost criterion is met. This embodiment prevents the container freezing fixed to the device.

A second aspect provides a cooling system for contact cooling of a beverage container. The system comprises a cooling element, a cooling contact body thermally conductively connected to the cooling element and arranged to be in thermally conductive contact with the container and a temperature sensing module arranged to sense temperature of at least one of the cooling contact body, the container and the beverage. The system further comprises a processing unit arranged to obtain an ambient temperature of the environment outside the container and the cooling contact body, define, based on the ambient temperature, a cut on temperature, obtain a medium temperature indicative of a temperature of the beverage and operate the cooling element if the medium temperature is larger than the cut on temperature until a pre-determined end criterion is met. The various embodiments of the first aspect may be implemented in the second aspect as well.

BRIEF DESCRIPTION OF THE DRAWINGS

In order to further elucidate the present invention, embodiments thereof shall be disclosed and discussed hereafter, with reference to the drawings. Therein shows.

DETAILED DESCRIPTION

Figure 1:
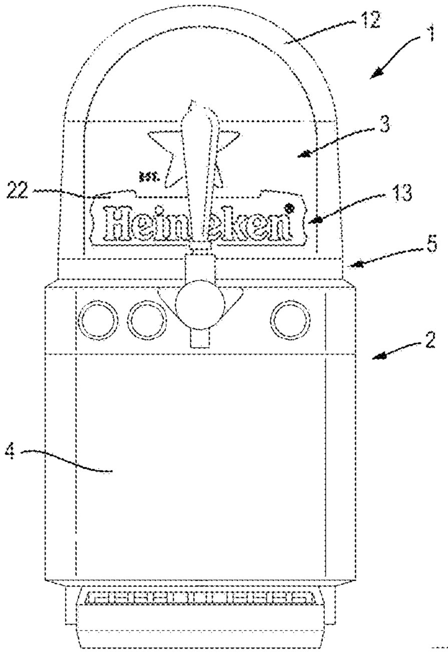
FIG. 1 a beverage dispensing assembly in a rear view, that is from a side of operating the dispensing assembly, with a branded container visible through a lid.

In this description embodiments are shown and disclosed of the invention, by way of example only. These should by no means be interpreted or understood as limiting the scope of the present invention in any way. In this description the same or similar elements are indicated by the same or similar reference signs. In this description embodiments of the present invention shall be discussed with reference to carbonated beverages, especially beer. However, other beverages could also be used in the present invention.

In this description references to above and below, top and bottom and the like shall be considered, unless specifically stipulated differently, to a normal orientation of a dispensing unit. The rear of the dispensing unit shall be referred to as the side at which a tap handle or the like is provided for operating the system, especially for operating for dispensing beverage contained in a container provided in and/or on the unit. The container can have a bottom part and a neck region comprising an orifice for filling and/or dispensing. The neck region can be an integral part of the container or can be assembled to the container. During use in embodiments the orifice within the assembly can be facing substantially downward, upward or sideways. A downward orientation is for example shown in the drawings, especially FIG. 1, wherein top, bottom, up and down are indicated by arrows and appropriate wording, for indicative purposes only. This does not necessarily reflect the orientation in which a tapping device of the present disclosure or parts thereof have to be used. For the container a normal position may be with a bottom portion facing down, a neck portion facing up. In a tapping assembly of the disclosure the bottom of the container may be facing up, down and/or side ways.

In the present disclosure by way of example a bag in container (BIC) shall be described, integrally blow moulded from a preform set comprising two plastic preforms, super imposed, which should be understood as meaning that one of the preforms is inserted into the other, after which they are together blow moulded in a known manner into a BIC. In embodiments prior to said blow moulding a closure ring is fitted over the preforms, connecting them together and closing off the space, which can also be referred to as interface or inter space, between the preforms, such that at least after blow moulding said space is or can be in communication with the environment only through one or more openings provided in a neck region of the container, especially an outward opening, extending through a wall of the neck region of the outer preform and/or container. The said at least one opening can be provided during manufacturing the preforms, especially during injection moulding thereof, but could also be provided later, for example by punching, drilling or otherwise machining into the container, during or after blow moulding.

In this description a tapping assembly can comprise a housing holding a cooling device and a pressure device for supplying pressurized gas, such as air, to a container. The container can be a plastic beverage container, preferably a BIC type container. The system further comprises a lid, preferably an at least partly transparent lid, fitting over the container when properly placed in the housing. The lid provides visibility of the container within the dispensing device comprising the housing and the lid, such that for example the filling level can be ascertained and branding of the container is visible from the outside.

In this description a dispensing assembly, which can also be referred to as tapping assembly, can be designed such that a container can be placed in an "upside down" position on and/or into a housing of a dispensing unit, such that at least part of the container, especially at least part of a shoulder part of the container is introduced in a receptacle on the housing, a neck portion comprising an outflow opening facing down. Preferably a part of the container extending into said receptacle, is close to or at least in part in contact with a wall of the receptacle, wherein the wall of the receptacle is cooled, especially actively cooled. In said "upside down" position this may for example be part of the shoulder portion of the container. In an "upright position" the shoulder portion may for example face upward, whereby a bottom portion can be received in the receptacle, especially for cooling. In a lying position or an inclined position a side portion of the container may be received in the receptacle for cooling.

In this description relatively close regarding a distance between the wall of the receptacle and the relevant container part should be understood as a distance small enough to allow efficient cooling of the said part of the container and its content. Preferably beverage is dispensed from an area of the container next to said portion of the wall cooled. Preferably a portion of the wall in the receptacle for cooling is in these embodiments a lower part of the container. In such embodiments the advantage is obtained that the content of the container will at least be in the area which is cooled by the wall of the receptacle, even if the container is partly empty, which cooled content is close to and especially directly adjacent the outflow opening or at least in a portion where the beverage is dispensed from. Thus control of the temperature of the beverage dispensed is very well possible, even if a part of the container extending outside the receptacle is not or less cooled.

In positioning the container in the receptacle preferably at least one line contact is obtained between the container and the wall of the receptacle, for contact cooling. Such line contact can for example be formed by a circle or elliptic line or any line, for example depending on the shape of the container and the receptacle and the orientation of the container. Preferably over a relatively large part of the container, such as for example the shoulder portion, the bottom portion or wall portion of the container extending inside the receptacle contact is established or at least a close proximity of the wall of the container relative to the wall of the receptacle. A distance between the relevant part of the container and the receptacle is preferably between 0 and 1 mm, measured as the smallest distance between adjacent surfaces, more preferably between 0 and 0.5 mm, even more preferably between 0 and 0.25 mm on average over at least part of a circumferential surface area of the receptacle having a height measure along a vertical axis of the receptacle which may for example be at least about ¼$^{th}$ of the height or diameter of the part of the container extending in said receptacle. For example in an upside down orientation at least about a quarter of the axial height of a shoulder portion of a container may be extending into said receptacle, measured directly adjacent the neck portion. For example between a quarter of and the whole said height of the shoulder portion.

Figure 1A:
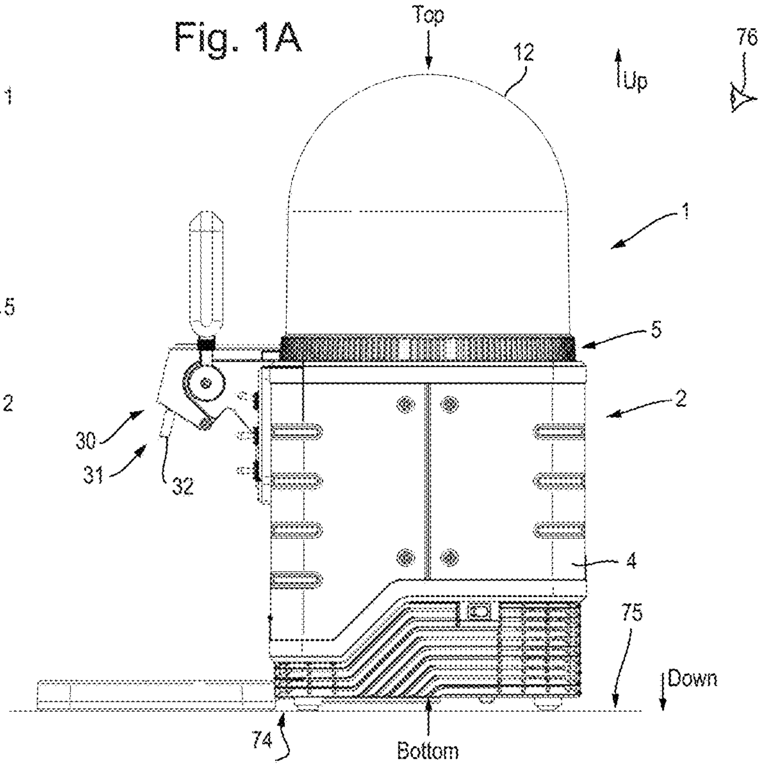
FIG. 1A a representation of a side view of an assembly of FIG. 1.
Figure 2A:
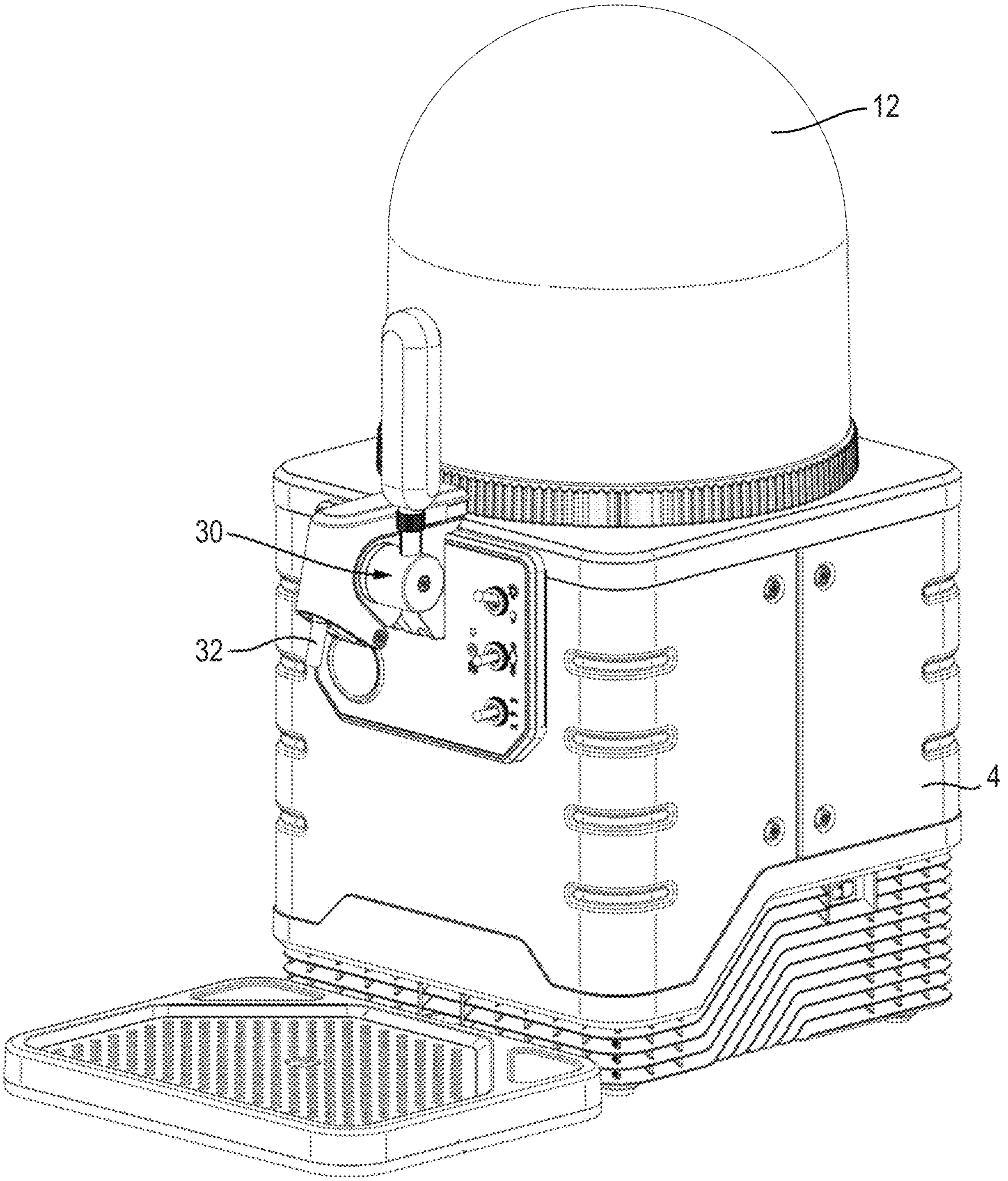
FIGS. 2A and B perspective views of an assembly of FIG. 1, in rear side view and front side view respectively.
Figure 2B:
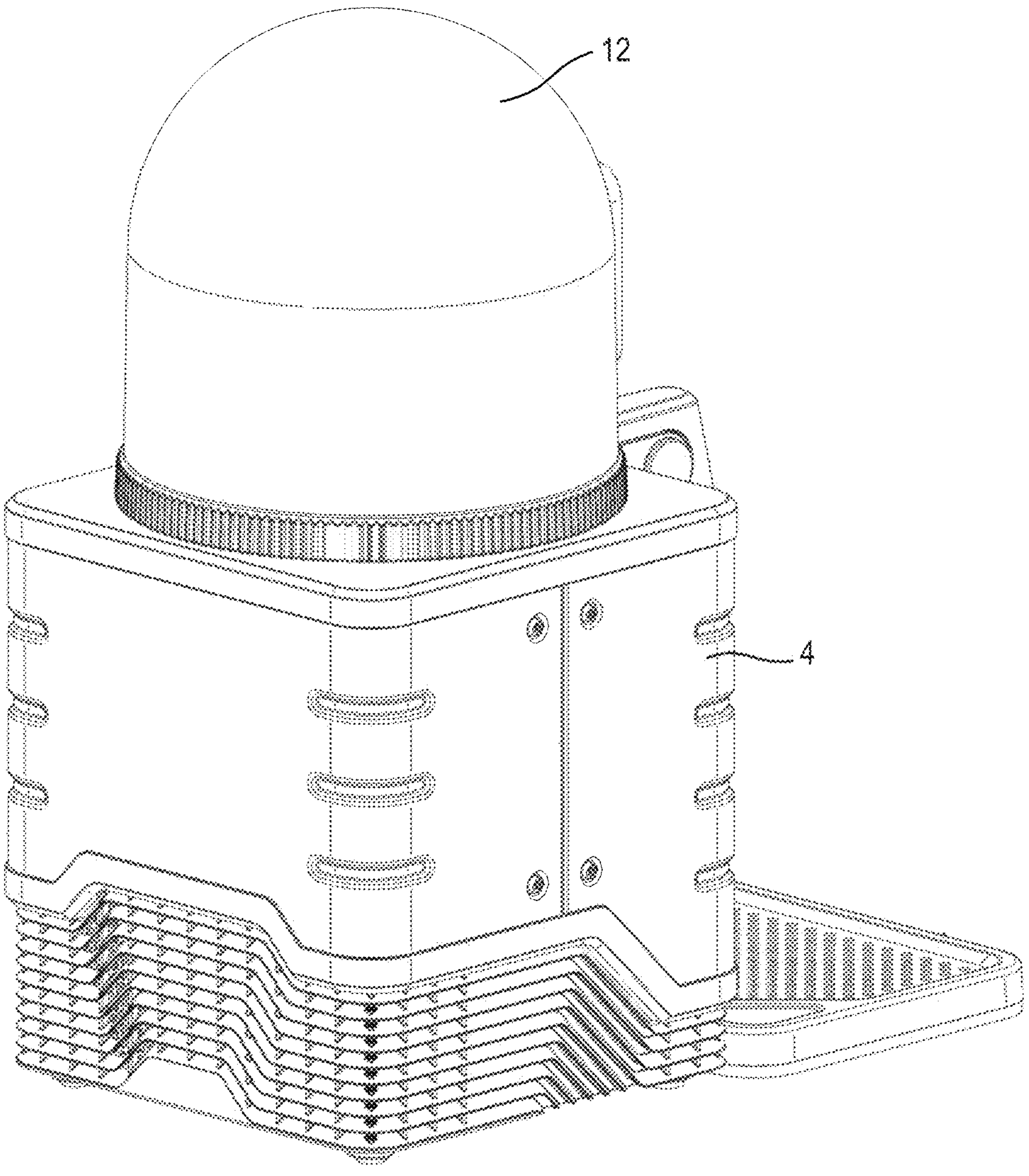

FIGS. 1 and 1A show an exemplary embodiment of a beverage dispensing assembly 1 of the disclosure, comprising a dispenser 2 and a beverage container 3. The dispenser 2 can also be referred to as for example unit, dispensing unit, tapping device or similar wording. The dispenser 2 comprises a housing 4. The housing 4 is provided with a receptacle 5 for receiving at least part 6 of the container 3. The beverage container 3 has a neck portion 7 and a shoulder portion 8 adjacent the neck portion 7. The neck portion 7 is provided with at least an outflow opening 8A and at least one gas inlet opening (not shown) (see e.g. FIG. 3). In the embodiments disclosed the container can be a blow moulded plastic container 3, preferably a Bag-in-Container (BIC) type container. The container 3 is positioned in the dispenser 2 with the neck portion 7 and shoulder portion 8 facing downward, such that the neck portion 7 and at least part of the shoulder portion 8 are received in the receptacle 5. This is referred to as an upside down orientation. A part 10 of the shoulder portion 8 extends close to and/or is in contact with a wall 11 of the receptacle 5.

An orientation of the container 3 in the dispensing device can be defined at least based on the orientation of a longitudinal axis X-X of the container, wherein in an upside down position and a straight up position said axis will extend substantially vertically, in a lying down position substantially horizontally and in an inclined position including an angle with both the horizontal and vertical direction. In a straight up position a bottom portion of the container may face downward, in an upside down position a bottom portion of the container may face upward, in a lying position it may face side ways.

In a different orientation of the container, the receptacle may be shaped differently. With the container lying, as specified directly above, the receptacle may be provided as a tub. In another implementation in which the container has a lying position, the receptacle may be provided as a cylinder, surrounding the container. In case visibility of the container is preferred, the receptacle may be implemented by means of one or more rings arranged to surround the container once placed in the receptacle—thus supported by the rings. Part of the container may be visible between the rings. Irrespective from any shape the receptacle may have, it is preferred there is sufficient thermally conductive contact between the receptacle and the container.

The dispensing assembly 1 is by way of example placed on a top 75 of a bar 74, such that the part 13 of the container 3 extending above the housing 4 and, if present, a lid 12 are at about eye level for an average adult person, in FIG. 1 indicated symbolically by eye 76. The top 75 of the bar can for example be, but is by no means limited to, at about 100 to 130 cm at a front side available for customers. By placing the tapping assembly 1 on a bar 74, visible for at least customers standing or sitting at the bar and preferably customers standing or sitting at the bar and personnel, standing behind the bar, the visibility of the system and especially of the relevant part 13 of the container is increased. Especially when branding 22 has been provided on said part 13 of the container 3 this will increase the appeal of the system 1 and especially of the beverage enclosed within said container 3. It has been found that this appeal will increase sales of the beverage and moreover may increase the appeal of the bar. Preferably a lid is provided over the part 13 of the container, which is sufficiently transparent to provide a view of the container part 13 from at least the front and behind of the bar 74, i.e. for customers and bar personnel, and preferably provides for a view of the container part 13 over about 360 degrees. A top part of the lid 12 could be less transparent, for example opaque.

The container 3 is preferably substantially barrel or bottle shaped, having said neck portion 7 and shoulder portion 8 and further having a body portion 23 and a bottom portion 24. The bottom portion may have any suitable shape and in the embodiment shown is substantially spherical, more specifically substantially a hemisphere. Alternatively it can for example be shaped such that the container can stand on said bottom portion 24, for example petal shaped.

In embodiments as shown a lid 12 is provided over the container 3, enclosing a part 13 of the container 3 extending outside the receptacle 5. However, the assembly can in embodiments also be operated without the lid 12. The lid 12 can be substantially dome shaped, at least to such extend that it has an inner surface 14 extending along the outer surface of the part 13 of the container 3 extending outside the housing 4, preferably at a substantially regular, equal distance. This may provide for a space 15 between said inner surface 14 of the lid 12 and the outer surface portion of the container. In embodiments the lid can have a top 16 which is substantially spherical and a body portion 17 which is preferably substantially cylindrical. The lid 12 may be made of plastic, preferably transparent plastic, such that the container 3 can be observed through at least part of the lid 12. In embodiments the lid 12 can be double walled, having an inner and an outer wall 18A, B, and a space 19 enclosed there between, preferably isolated from the surroundings thereof, such as the area 20 in which the assembly is positioned and the space 15. In embodiments the space 19 can be at a pressure lower than the pressure inside the area 20 and/or space 15, and can for example be sucked vacuum, in order to lower the heat transmissibility of the lid 12. In embodiments the lid 12 can rest on a seal 21 of the housing 4 and/or can be provided with a seal 21 for resting on the housing 4, such that the space 15 is isolated from the area 20 once the lid 12 has been properly placed on and/or in and/or over the housing. In embodiments this can provide for a substantially stagnant layer of air in said space 15. In other embodiments a fan or similar means can be provided for providing an air flow of preferably cooled air through said space 15 for cooling the container and the beverage contained therein. The lid can also be made partly or entirely of glass.

In preferred embodiments the container 3 is provided with branding 22, at least on the part 13 of the container 3 extending outside the housing 4. Said branding 22 is preferably provided such that at least part of it is provided in an upside down orientation when the container 3 is placed on its bottom 24. Thus when the container 3 is placed in an upside down position in the dispenser 2, the neck portion 7 facing down, the branding is in the proper orientation for readability and visibility. Obviously when a container 3 is intended for use in a straight up orientation, i.e. an orientation with the bottom facing down in a dispensing device 1, the branding may be in a normal position for readability and visibility. Similarly such branding could be adjusted on a container for use in another orientation, for example lying down.

In the embodiments shown in e.g. FIGS. 1 and 1A, 3 and 3A the housing 4 comprises a cooling device 26 for cooling at least a part 27 of the wall 11 of the receptacle 5. Similarly the other embodiments can be provided with the same or a similar cooling device. The receptacle 5 and cooling device 26 are preferably designed for contact cooling of a part 6 of the container 3, for example at least the shoulder portion 8 of the container 3 in the upside down orientation, or a bottom portion, for example in a straight up orientation.

As is clear from the exemplary embodiments this will lead to cooling of at least the beverage in an area close to the receptacle, such as for example close to the neck portion 7, from which the beverage will be dispensed, this beverage thus being cooled at a desired temperature. Preferably this portion is at a lower end of the container during use, such that the coolest beverage will naturally flow towards that area. The cooling of the receptacle can be provided for by any suitable means, such as a compressor based cooling device, a piezo-electric based cooling device, ice cube cooling, liquid cooling or the like systems as known in the art. By way of example a compressor based cooling device 26 will be described, as an advantageous embodiment.

The container 3 in the embodiments as shown is provided with a dispensing unit 34 including at least a dispensing line 35 for dispensing the beverage. The housing 4 comprises a tap 29 for connecting to and/or cooperating with the dispensing line 35, for opening and/or closing the dispensing line 35. The dispensing line is preferably a disposable line, which should be understood as meaning that it is designed and intended for limited use, for example with only one container 3 or a limited number of containers. Preferably the dispensing unit 34 is designed such that the container 3 can be broached with it, after which the dispensing unit 34 and/or the dispensing line 35 cannot be removed again, without damage to the unit 34 and/or container 3.

In preferred embodiments the tap 29 comprises an operating mechanism 30 for opening and/or closing a valve 31 provided in the dispensing unit 2, especially a valve provided in or at an end of the dispensing line 35. The dispensing line 35 can be made of plastic and can be flexible, such that it can be bent as shown. The valve 31 is fixedly connected to the tapping line 35, such that it is placed and removed, i.e. exchanged together with the dispensing line 35. The valve 31 can have a spout 32 extending outside the housing 4, such that the spout 32 is the last point of contact for the beverage to be dispensed. By providing such valve 31 which is disposable contact between the beverage and the further dispensing assembly 1 can be prevented. Thus cleaning of the dispensing assembly has to be cleaned less frequently.

Alternatively other means for opening and/or closing the dispensing line 35 can be provided for, such as but not limited to means for squeezing the tapping line shut. A permanent valve can be used as part of the tapping device 2, to which the tapping line 35 can be connected when placing the container. Alternatively or additionally the tapping line can be permanent or semi permanent, wherein the container, especially an adapter 38 as discussed can be connected to said tapping line.

Figure 3A:
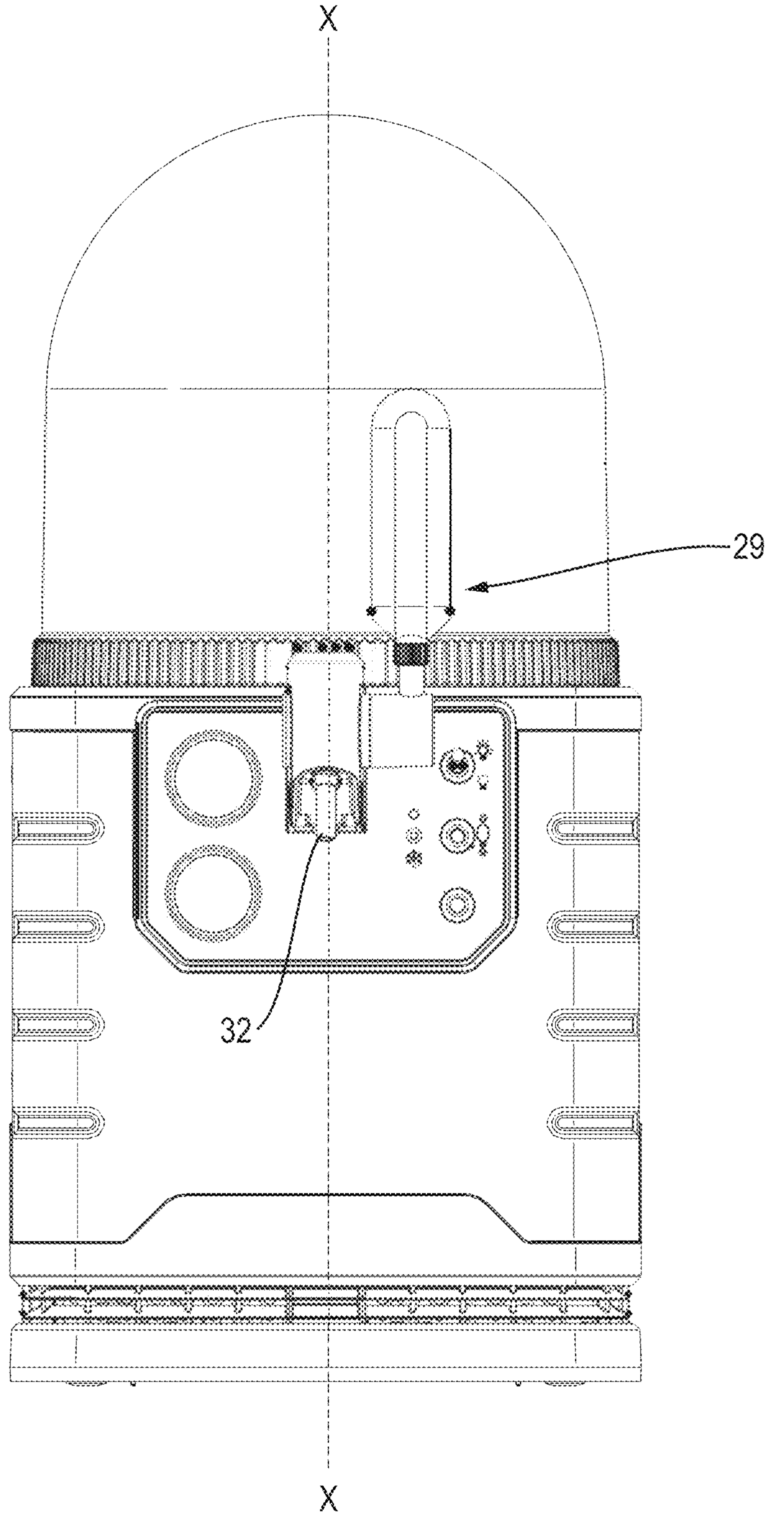
FIGS. 3A and B a dispensing assembly according to the disclosure, in rear view and in cross sectional side view.

As can for example be seen from FIG. 3A an B the receptacle 5 can or example be substantially bowl shaped, for example semi spherical, such that the container 3 can be supported by the wall 11 of said receptacle 5 by at least part of the shoulder portion 8 in the upside down position, or a bottom portion, in a straight up position. Preferably in close contact for contact cooling. At a lower end of the receptacle 5 an indentation 36 can be provided for receiving the neck portion 7 of the container, with the dispensing unit 34 or at least part thereof provided on the neck 7, when using a container in an upside down position, or for example such unit 34 connected or to be connected to a bottom portion 24, especially an inlet opening of a container 3 in a straight up position for connecting a gas line. In embodiments the indentation 36 can be such that the neck 7 and/or dispensing unit 34 do not rest on a bottom 37 of the indentation 36. In embodiments using a straight up position, for example a gas line connector can be position in such indentation.

As discussed a cooling system 26 is provided in the housing 4, here shown as a compressor and evaporator based cooling system, which has cooling lines 95 or the like extending in close proximity to or inside the wall 11 of the receptacle 5 and possibly the indentation 36, for cooling the wall 11 or at least a relevant part thereof. The cooling device 26 is preferably designed to keep the wall 11 at a predefined temperature, or at least to cool the wall such that at least the beverage close to the outlet opening, i.e. in the neck 7 and possibly the shoulder portion 8 at a desired temperature or as close as possible to it. Depending on the beverage and a users preference this temperature can preferably be set, for example but not limited to between about 4 and 9 degrees Celsius, for example around 6 degrees Celsius. Other temperatures or temperature ranges can be set; another preferred range is between 0 and 2 degrees Celsius. It is possible to define another range, starting at any value of zero, one, two, three or four degrees Celsius or any value in between those values up to two, three, four, five, six, seven, eight, nine or ten degrees Celsius or any value in between those values, with preferably at least one degree between the lower and higher value of the control interval.

Figure 3B:
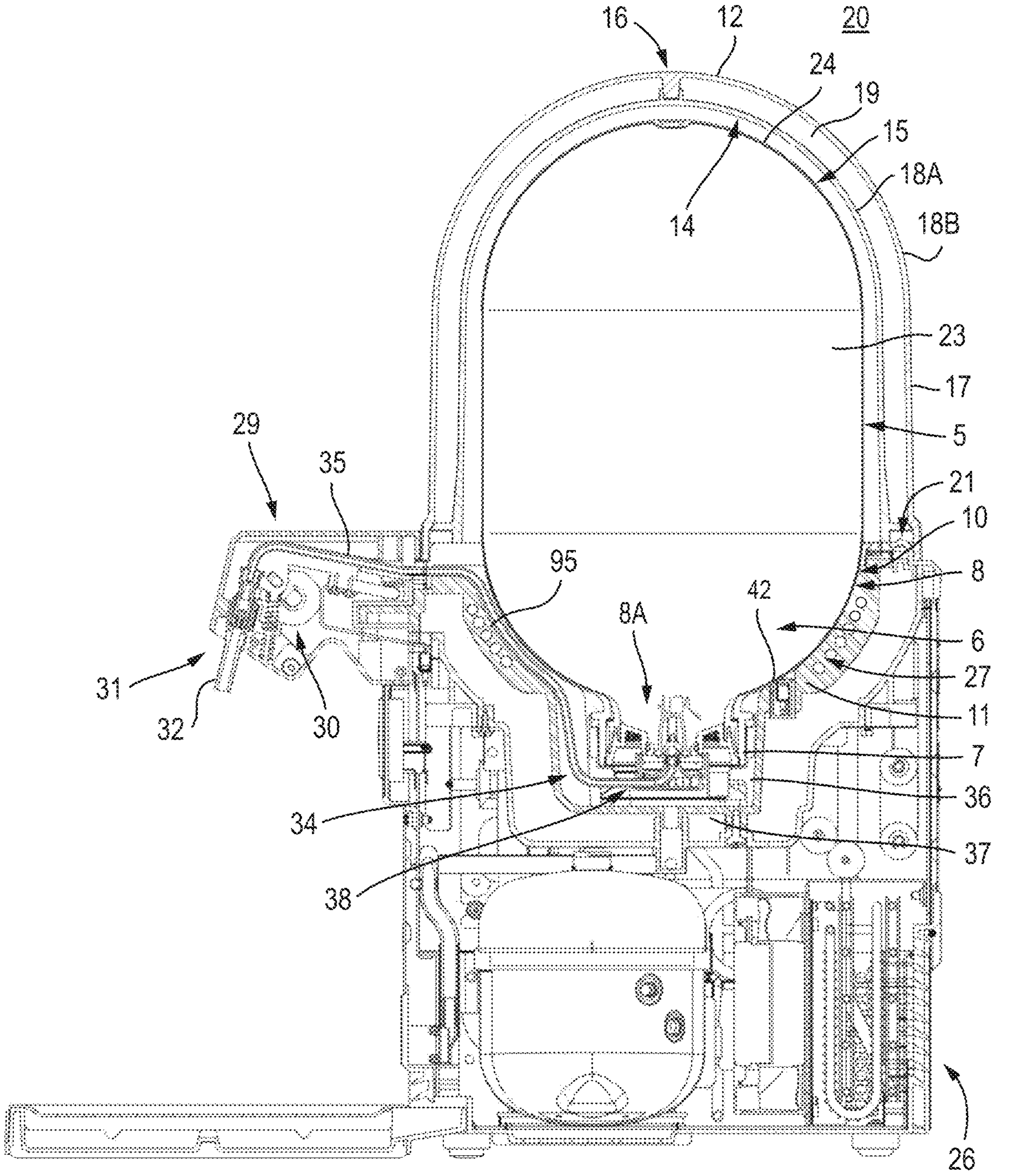
Figure 4:
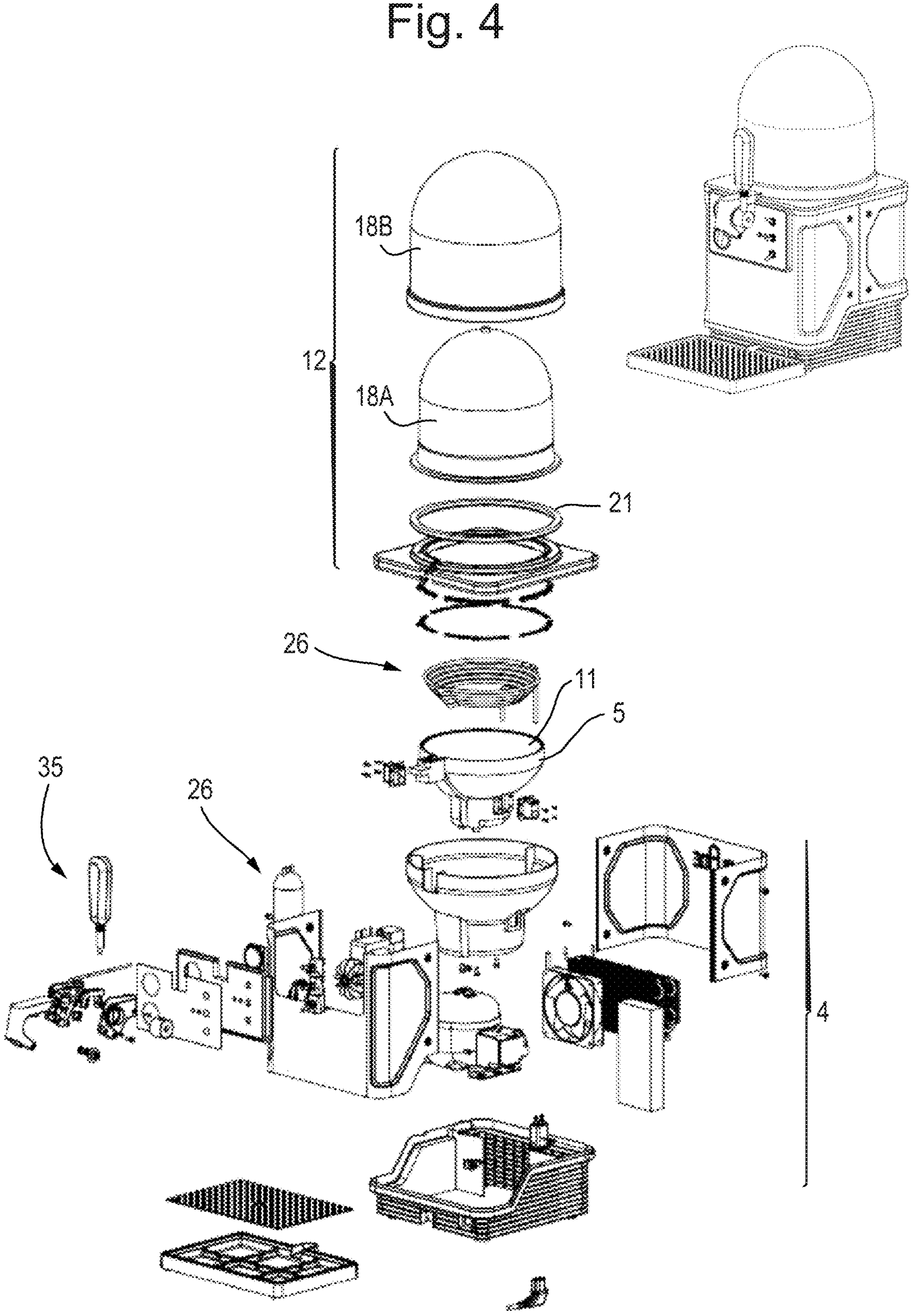
FIG. 4 an exploded view of a dispensing unit of an assembly for dispensing beverage.

As can be seen in e.g. FIG. 3B, the shoulder portion 8 of the container can fit to the wall 11 of the receptacle closely, whereas the inner container 3B in the shoulder portion can fit snugly along the inner surface of the outer container. Thus contact cooling between the wall 11 and the shoulder portion of the container 3 has surprisingly proven to be highly effective.

It is noted that the receptacle 5 may be differently shaped, fitting other types of containers than depicted by FIG. 3B.

If the temperature sensor 42 is arranged to sense temperature of the container 3, the temperature sensor 42 is preferably isolated from the wall 11 and protrudes from the wall 11 to ensure contact with the wall of the container 11. Optionally, the temperature sensor 42 may be resiliently suspended such as not to block the wall of the container 3 to fit in the receptacle 5 as good as possible and ensure good contact with the wall 11.

If the temperature sensor 42 is arranged to sense temperature of the wall 11, the temperature sensor 42 is provided such that it cannot contact the container 3 if the container 3 is provided in the receptacle 5. In another implementation, an additional temperature sensor is provided, such that the temperature sensor 42 senses temperature of a first of the wall 11 and the container 3 and the additional temperature sensor senses temperature of a second of the wall 11 and the container 3.

In yet another embodiment, the temperature of the beverage in the container 3 is obtained at a particular location in the container; at the top of the container, at the bottom of the container, in the middle of the container, other, or a combination thereof. As such, a temperature sensor may be provided in the container 3 in wired or wireless communication with a controller.

As the beverage gets cooler, the temperature sensor 42 sensing the container temperature will sense a decrease of temperature increase rate over time. The temperature increase rate may be defined as a time interval between switching of cooling—or decreasing operation level—and reaching a maximum allowed temperature sensed by the temperature sensor 42. Alternatively or additionally, the temperature increase rate may be defined as an increase of sensed temperature per amount of time. In such case, the temperature increase rate may be defined momentarily—calculated over a very small amount, optionally almost infinitesimal, of time or over a longer period in the order of second, minutes or hours. In another embodiment, a derivative of a function of temperature vs. time is defined as the temperature increase rate, calculated either analytically, numerically or a combination thereof.

The temperature sensor 42—in this implementation sensing container temperature—is placed at the wall of the container 3, close to the wall 11 of the receptacle 5 that is being cooled by means of the cooling system 26. Therefore, the sensed temperature of the beverage located close to the wall of the receptacle 5 will be lower than the temperature of beverage at higher locations in the container 3. When the cooling system 26 is switched off, no more thermal energy is withdrawn from the wall 11 and less or no thermal energy will be withdrawn from the beverage in the container 3 and the temperature distribution in the beverage will move to an equilibrium. As a result, the temperature of the beverage close to the temperature sensor 42 will rise.

Due to basic principles of thermodynamics, the rate at which the temperature rises after the cooling system 26 has been switched off depends on a temperature gradient in the beverage. If the momentary average temperature of the beverage in the container 3 is relatively low, the rising of the temperature as sensed by the temperature sensor 42 will be at a rate lower than if the momentary average temperature of the beverage in the container 3 is relatively high. Reason is that if the momentary average temperature of the beverage is relatively high, thermal energy will flow faster to the cooled wall 11 by virtue of well-known diffusion laws that govern diffusion induced flow of thermal energy.

The operation of the cooling system will be further elucidated in conjunction with a flowchart 500 depicting an implementation of the first aspect. The procedure may be controlled by a processing unit comprised by the beverage dispensing assembly 1. Such processing unit may be a microprocessor, a microcontroller, a PLD, an FPGA or another electronic or electrical computing module arranged to fulfil this task. The various parts of the flowchart 500 may be summarised as follows:

502 start procedure
504 receive the container
506 determine beverage volume in the container
508 determine ambient temperature
510 define cut on temperature
512 operate cooling element
514 operation time lapsed?
516 temperature below cut off temperature?
518 decrease or cease operation of cooling element
522 temperature equal to or above cut on temperature?
524 defrost time limit passed?
526 defrost temperature reached?
528 decrease or cease operation of cooling element The procedure starts in a terminator 502, and continues to step 504, in which the container 3 is received in the receptacle 5 such that it is in contact with the wall 11 of the receptacle. Such contact may be over substantially the whole surface of the wall 11; alternatively, it may be over one or more parts of the wall.

In step 506, the beverage volume in the container 3 is determined. The beverage volume is preferably based on an initial beverage volume that the container 3 is arranged to hold; 2 litres, 3 litres, 4 litres, 5 litres, 6 litres, 8 litres, 10 litres or other. If no beverage is withdrawn from the container 3, the amount of beverage is determined to be equal to the initial amount.

If beverage has been withdrawn from the container 3, it may be determined what amount of beverage has left the container 3. To that purpose, it may be determined how much beverage has been dispensed from the container 3. This may be determined by applying a flowmeter to the dispensing line 35 or another conduit in the dispensing flow path between the container 3 and the spout 32. The flowmeter may be arranged to determine a flow rate and/or a volume of beverage that has passed the flow meter. Based on this data and the initial amount of beverage in the container 3, the current amount of beverage in the container may be determined.

In another embodiment, the flow rate of beverage through the flow path between the container 3 is constant or assumed to be constant. In such embodiment, the time the valve 31 is opened is determined and that time is multiplied by the flow rate to obtain a volume of beverage that has left the container 3. With that information—and an initial volume—the amount of beverage left in the container 3 may be determined.

In yet another additional or alternative embodiment, the weight of the container 3 is measured by means of a weighting module comprised by the beverage dispensing assembly 1. By obtaining weight of the container 3 and the beverage stored therein and subtracting the weight of the (empty) container and, optionally, of any other non-beverage element, the amount of beverage in the container 3 may be determined.

Next, in step 508, the ambient temperature of the beverage dispensing assembly 1 may be determined. This the temperature outside the beverage dispensing assembly 1, in the direct vicinity of the beverage dispensing assembly 1.

In step 510, a cut on temperature is determined at which temperature of the beverage in the container 3—or temperature of the container 3 or temperature of the wall 11—the cooling device 26 is to switch on or increase operation. The cut on temperature is preferably determined based on at least one and preferably both of the amount of beverage left in the container 3 and the ambient temperature of the beverage dispensing assembly 1. A possible relation between the amount of beverage left in the container 3 and the ambient temperature of the beverage dispensing assembly 1 is shown in FIG. 6.

Figure 6:
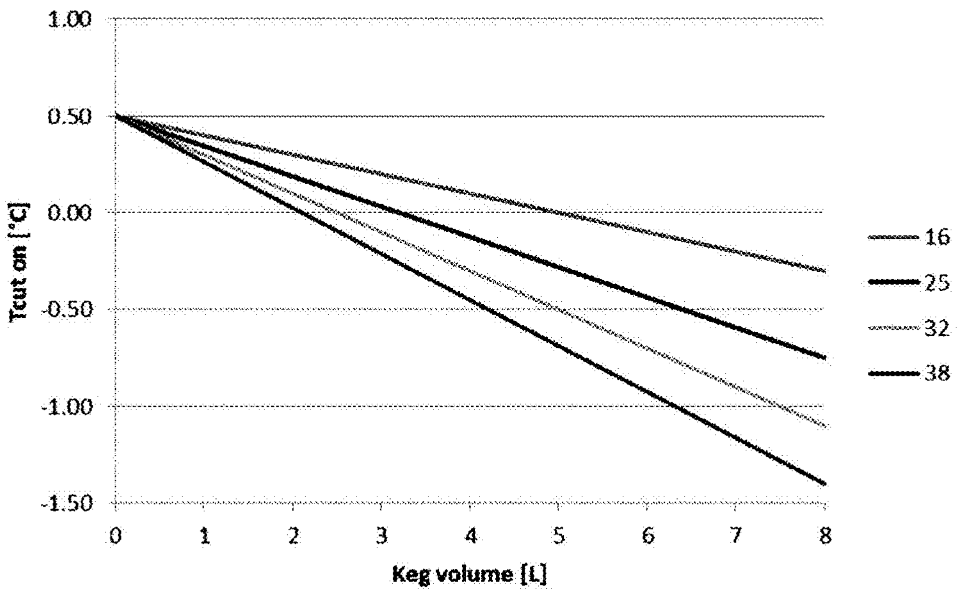
FIG. 6 a graph depicting a possible relation between cut on temperatures, ambient temperature and beverage volume left in a container.

FIG. 6 shows a linear relation between the cut on temperature on one hand and the ambient temperature and the beverage amount in the container on the other hand. Alternatively, at least one or both of the relations may be non-linear or may comprise a non-linear part. The relation between the cut on temperature on one hand and the ambient temperature and the beverage amount in the container on the other hand may be stored in a memory coupled to the processing unit as discussed above. The values and relationship curves as shown by FIG. 6 are provided merely as an embodiment and other relations may be implemented as well.

In step 512, the cooling device 26 is operated to cool the wall 11 of the receptacle 5. The cooling device 26 is operated, while monitoring at least one of an operating time period and sensed temperature of at least one of the beverage, the container 3 and the wall 11. In step 514, the operating time period of the cooling device 26 is compared to a predetermined time period for operating the cooling device 26. In step 516, the monitored temperature of at least one of the beverage, wall of the container 3 and the wall 11 is compared to a predetermined cut-off temperature. Step 516 and step 514 may executed in parallel or in series. Alternatively, only of step 516 and step 514 is executed.

Figure 5:
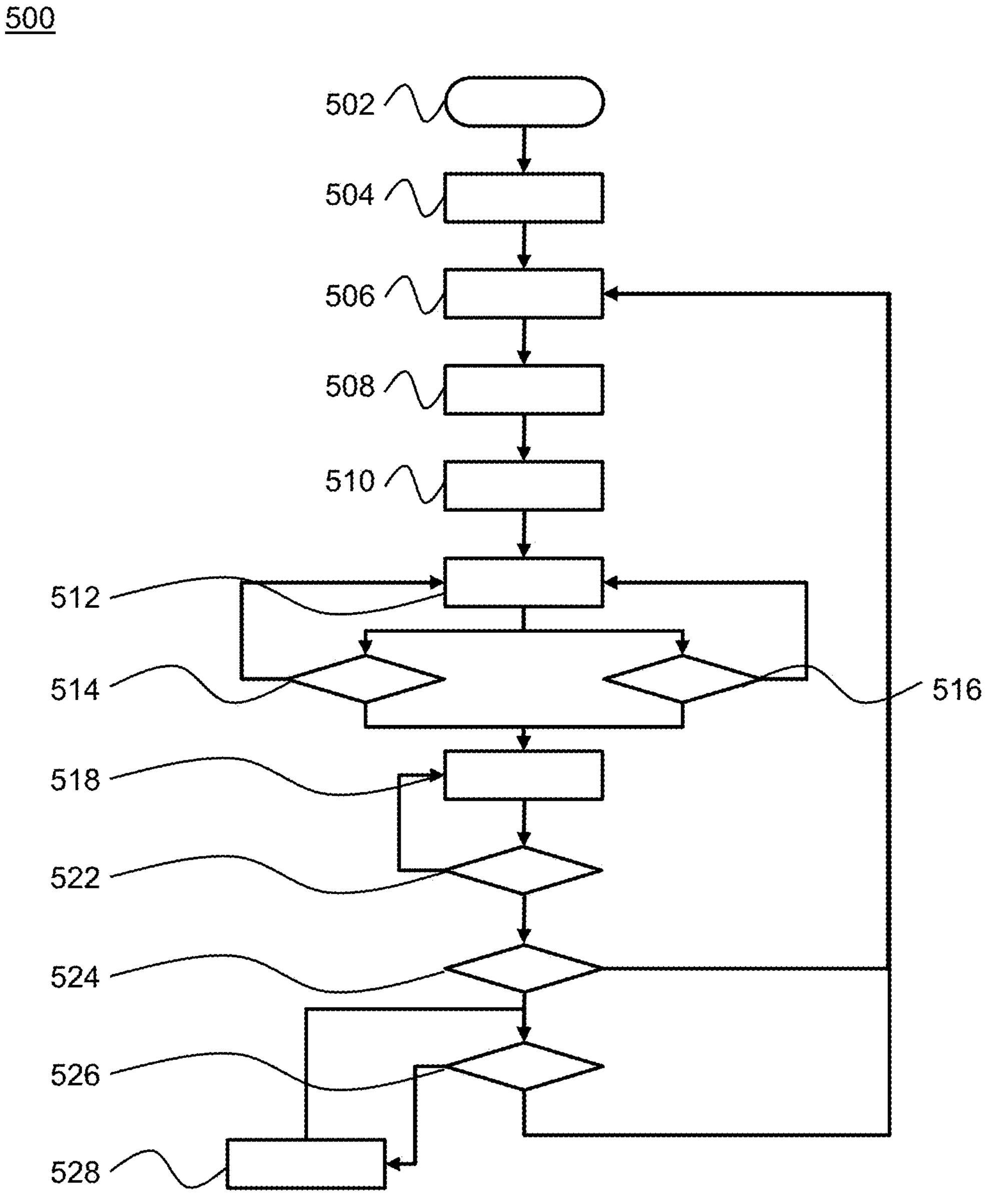
FIG. 5 a flowchart depicting an embodiment of the first aspect.

In the embodiment of FIG. 5, if at least one of the tested criteria is met, the procedure continues to step 518. In step 518, the operation of the cooling device 26 is decreased and preferably ceased. Step 518 may comprise a waiting loop before proceeding to the next step.

In step 522, the sensed temperature is compared to the cut on temperature defined as discussed above. If the sensed temperature is below the cut on temperature, the procedure branches back to step 518. If the sensed temperature is above the cut on temperature, the procedure continues to step 524, at which step a defrost time period since a previous defrost action is tested to a defrost time limit. If it has been longer than the defrost time limit, for example two, three, four, five hours or more, operation of the cooling device 26 is still ceased until a defrost temperature is reached. The latter is checked in step 526.

If the defrost time limit has not been reached, yet, the procedure branches from step 524 to step 506 if the cut on temperature has been reached or exceeded. Alternatively, the procedure may branch back to step 512.

If the defrost time limit has lapsed, the sensed temperature is tested. If the defrost temperature has not been reached, yet, the procedure continues to step 528, in which the operation of the cooling device 26 is further ceased. Step 528 may comprise a waiting loop. After step 528, the sensed temperature is compared to the defrost temperature again. If the defrost temperature is reached, the procedure branches back to step 506. Alternatively, the procedure may branch back to step 512. The defrosting subroutine may prevent any beverage in the dispensing line 35 to freeze or otherwise solidify. Furthermore, it may prevent the container 3 freezing to the wall 11 such that the container 3 may be fixated to the wall 11 and hence very difficult to remove by a person.

The various steps of the method depicted by the flowchart 500 may be executed in the order as indicated by the flowchart 500. Additionally or alternatively, at least some steps, including, but not limited to the steps with numbers 506, 508 and 510 may be executed continuously or periodically at points in time irrespective of a step of the flowchart 500 executed at a particular moment.

The invention is by no means limited to the embodiments specifically disclosed and discussed here above. Many variations thereof are possible, including but not limited to combinations of parts of embodiments shown and described. For example the at least one opening can be provided in a different position, for example extending through the closure ring 47, preferably in substantially radial direction outward, for example through the inner surface or wall of the ring, into the space between the containers, wherein the adapter 38 can extend into the ring for communicating properly with said at least one opening. The container can be provided with only one opening in the neck or several such openings. In embodiments the container can be a single wall container, wherein the gas can be inserted directly into the beverage, for example CO2 or nitrogen gas. In embodiments the container can be compressible by pressurizing the space within the lid. In embodiments the closure ring 47 and adapter 38 can be integrated. They can then be connected directly onto the container 3 as a closure and be suitable as the adapter. In embodiments the dispense adapter and the adapter can be integrated, with each other and/or with the closure ring. In stead of a valve in the container a different closure can be used, for example a pierceable closure, pierceable by the adapter and/or the dispense adapter, or a removable closure which can then be replaced with the adapter and/or dispense adapter for cooperation with the tapping device.

These and many other amendments are considered to have been disclosed herein also, including but not limited to all combinations of elements of the invention as disclosed, within the scope of the invention as presented.

In summary, a method is provided for cooling a beverage in a container, the container being provided in contact with a cooling contact body thermally conductively coupled to a cooling element. The method comprises operating the cooling element and obtaining an ambient temperature of the environment outside the container and the cooling contact body. Based on the ambient temperature, a cut on temperature is defined and a temperature value indicative of a temperature of the beverage is obtained. The cooling element is operated if the temperature is larger than the cut on temperature until an end criterion is met. A higher ambient temperature may require more cooling of the beverage to ensure the temperature of the beverage is maintained between acceptable boundaries. A higher environmental temperature, requiring more cooling, means faster switching on or off. By using a switch on temperature based on the ambient temperature, more efficient cooling may be established.

The invention claimed is:

1. A method of cooling a container comprising a beverage, the container being provided in contact with a cooling contact body thermally conductively coupled to a cooling element, the method comprising:
- operating the cooling element;
- obtaining an ambient temperature of the environment outside the container and the cooling contact body;
- defining, based on the ambient temperature, a cut on temperature;
- obtaining a medium temperature indicative of a temperature of the beverage;
- operating the cooling element if the medium temperature is larger than the cut on temperature until a predetermined end criterion is met.

2. The method according to claim 1, wherein the cut on temperature decreases if the ambient temperature rises.

3. The method according to claim 2, wherein the relation between the cut on temperature and the ambient temperature is substantially linear.

4. The method according to claim 1, further comprising:
- obtaining a beverage volume stored in the container; and
- defining the cut on temperature also based on the beverage volume.

5. The method according to claim 4, wherein the cut on temperature rises if the beverage volume decreases.

6. The method according to claim 5, wherein the relation between the cut on temperature and the beverage volume is substantially linear.

7. The method according to claim 4, wherein the determining of the beverage volume stored in the container comprises:

receiving an initial value of an initial volume beverage stored in the container;

tracking a withdrawn volume of beverage removed from the container; and subtracting the withdrawn volume from the initial volume.

8. The method according to claim 4, wherein obtaining a beverage volume stored in the container comprises at least one of:

determining an amount of beverage dispensed;

determining a weight of the container including the beverage volume stored therein.

9. The method according to claim 1, wherein the pre-determined end criterion is at least one of:

a medium temperature end value of the medium temperature; and a cooling time interval lapsed from the moment of the start of the operation of the cooling element.

10. The method according to claim 9, wherein at least one of the medium temperature value and the cooling time interval is based on at least one of:

the medium temperature;

the ambient temperature;

the beverage volume.

11. The method according to claim 9, wherein the pre-determined end criterion is the cooling time interval lapsed from the moment of the start of the operation of the cooling element, further comprising:

if the cooling time interval has lapsed, obtain the medium temperature;

continue operation of the cooling element if the medium temperature is higher than or equal to the cut-on temperature, until the cooling time interval has lapsed again.

12. The method according to claim 1, further comprising if a pre-determined defrost interval has lapsed, not operating the cooling element if the medium temperature is larger than the cut on temperature until a pre-determined defrost criterion is met.

13. The method according to claim 12, wherein the pre-determined defrost criterion is at least one of:

a medium temperature defrost value of the medium temperature; and a cooling time interval lapsed from the moment of the start of the operation of the cooling element.

14. The method according to claim 1, wherein the medium temperature is at least one of the following:

a container temperature of the container;

a beverage temperature of the beverage;

a cooling contact body temperature of the cooling contact body.

15. A cooling system for contact cooling of a beverage container, the system comprising:

a cooling element;

a cooling contact body thermally conductively connected to the cooling element and arranged to be in thermally conductive contact with the container;

a temperature sensing module arranged to sense temperature of at least one of the cooling contact body, the container and the beverage; and a processing unit arranged to:

obtain an ambient temperature of the environment outside the container and the cooling contact body;

define, based on the ambient temperature, a cut on temperature;

obtain a medium temperature indicative of a temperature of the beverage; and operate the cooling element if the medium temperature is larger than the cut on temperature until a pre-determined end criterion is met.

* * * * *